US006963475B2

(12) United States Patent
Klippel et al.

(10) Patent No.: US 6,963,475 B2
(45) Date of Patent: Nov. 8, 2005

(54) MONITORING AND CONTROL FOR POWER ELECTRONIC SYSTEM

(75) Inventors: Todd W. Klippel, Oak Park, IL (US); Richard P. Mikosz, Hickory Hills, IL (US); Ronald D. Atanus, Mt. Prospect, IL (US); Michael G. Ennis, Evanston, IL (US); Raymond P. O'Leary, Evanston, IL (US); Joseph W. Ruta, Arlington Heights, IL (US); Gregory C. Mears, Chicago, IL (US)

(73) Assignee: S & C Electric Co., Chicago, IL (US)

( * ) Notice: Subject to any disclaimer, the term of this patent is extended or adjusted under 35 U.S.C. 154(b) by 0 days.

(21) Appl. No.: 10/970,504

(22) Filed: Oct. 22, 2004

(65) Prior Publication Data

US 2005/0052807 A1  Mar. 10, 2005

Related U.S. Application Data

(60) Division of application No. 10/392,031, filed on Mar. 19, 2003, now Pat. No. 6,917,186, which is a continuation-in-part of application No. 10/192,441, filed on Jul. 11, 2002, now Pat. No. 6,667,601, which is a division of application No. 09/556,259, filed on Apr. 24, 2000, now Pat. No. 6,504,696.

(60) Provisional application No. 60/375,799, filed on Apr. 26, 2002, provisional application No. 60/369,202, filed on Apr. 1, 2002, provisional application No. 60/131,724, filed on Apr. 30, 1999.

(51) Int. Cl.$^7$ ............................................. H02H 3/18
(52) U.S. Cl. ...................................................... 361/79
(58) Field of Search ................................. 323/268, 270, 323/271, 273, 275–277, 279, 282; 361/18, 361/67, 68, 79, 86, 87, 91.1, 91.8, 93.9; 327/379–381, 327/383, 419, 438, 440

(56) References Cited

U.S. PATENT DOCUMENTS 4,620,258 A * 10/1986 Bloomer ..................... 361/91.2
6,097,582 A *  8/2000 John et al. .................... 361/79
6,125,024 A *  9/2000 LeComte et al. ........... 361/104

* cited by examiner

Primary Examiner—Matthew V. Nguyen
(74) Attorney, Agent, or Firm—James V. Lapacek

(57) ABSTRACT

A control method and arrangement that monitors the condition and operating parameters of a power electronic system having power electronic devices and responds to various detected abnormalities to optimize operation of the power electronic system. The arrangement increases reliability of operation and optimizes the continuous supply of power to a load. The arrangement also includes the capability for diagnosing the parameters of the power electronic switches including drive current, drive voltage and operating temperature and for communicating the status information in a coordinated fashion.

4 Claims, 4 Drawing Sheets

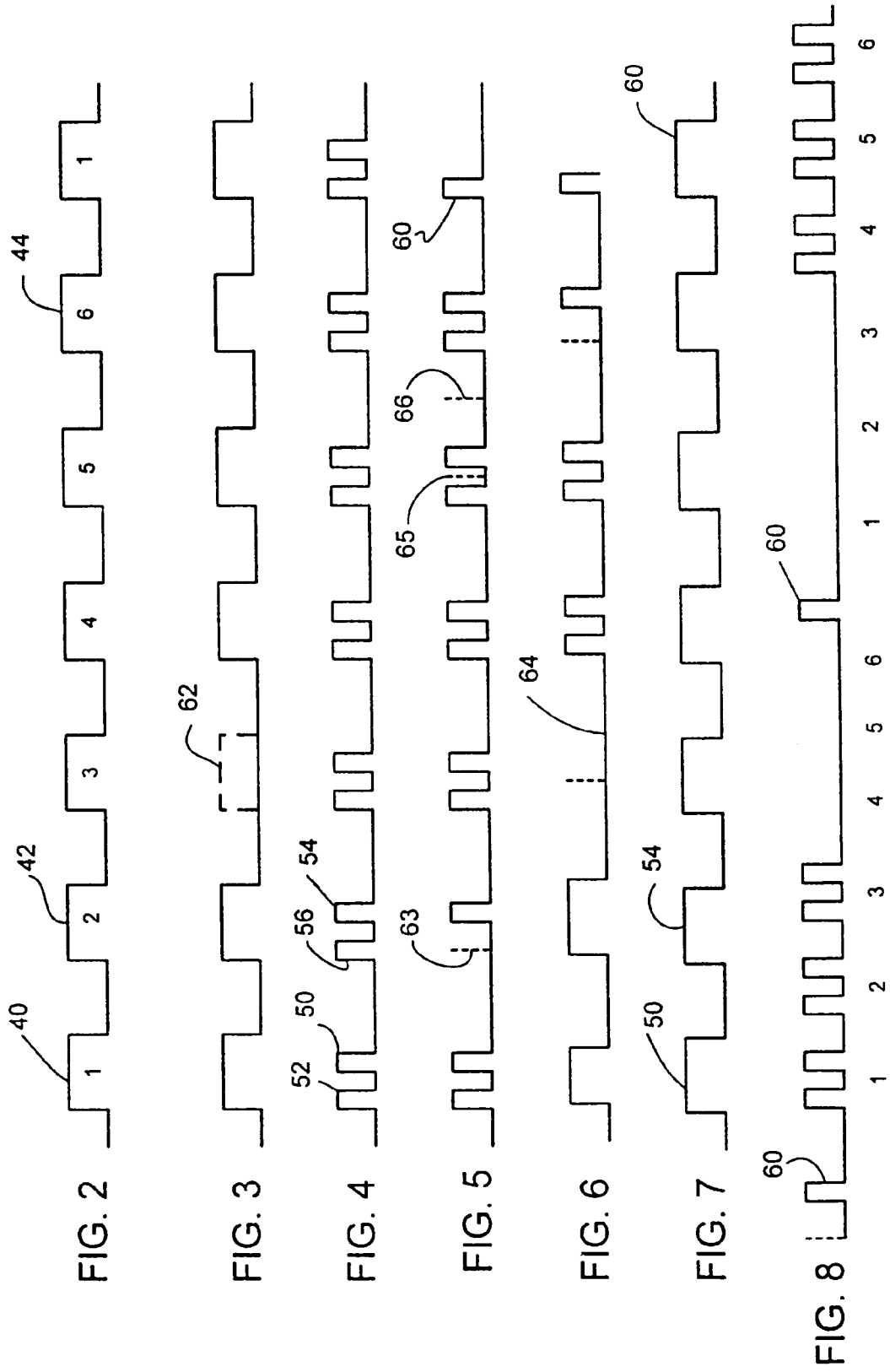

МОNITORING AND CONTROL FOR POWER ELECTRONIC SYSTEM

This application is a divisional application of application Ser. No. 10/392,031 filed Mar. 19, 2003 now U.S. Pat. No. 6,917,186 in the names of Klippel et al. which in turn is a continuation-in-part application of application Ser. No. 10/192,441 filed on Jul. 11, 2002 now U.S. Pat. No. 6,667,601 in the names of Mikosz et al. (which in turn is a divisional application of application Ser. No. 09/556,259 filed on Apr. 24, 2000 now U.S. Pat. No. 6,504,696 based on Provisional application No. 60/131,724 filed on Apr. 30, 1999) and claims the benefit of U.S. Provisional Application Nos. 60/375,799 filed on Apr. 26, 2002 and 60/369,202 filed on Apr. 1, 2002.

BACKGROUND OF THE INVENTION

1. Field of the Invention

The present invention relates generally to the field of power electronic systems and more particularly to control methods and arrangements that monitor the condition and operating parameters of the power electronic system and power electronic switches and provide appropriate action to optimize operation thereof.

2. Description of Related Art

Various power electronic systems are known for supplying power, regulating power, and transferring power from one source to another in order to provide continuous power to a load. Ascertaining the proper operation of the various components of these systems is important in order to most appropriately decide how to best assure the continuous supply of power to the load. While these arrangements may be useful and generally satisfactory for their intended purposes, they do not provide appropriate diagnostics or system control with sufficient emphasis on the priority of the continuous supply of the connected load.

SUMMARY OF THE INVENTION

Accordingly it is a principal object of the present invention to provide a control method and arrangement that monitors the condition and operating parameters of a power electronic system having power electronic devices and responds to various detected abnormalities to optimize operation of the power electronic system.

It is another object of the present invention to provide a diagnostic arrangement for a power electronics system including power electronic switches that monitors the parameters of power electronics switches including drive current and voltage at a control connection of the series-connected switches in a stack of stages that make up a power electronic switch.

These and other objects of the present invention are efficiently achieved by a control method and arrangement that monitors the condition and operating parameters of a power electronic system having power electronic devices and responds to various detected abnormalities to optimize operation of the power electronic system. The arrangement increases reliability of operation and optimizes the continuous supply of power to a load. The arrangement also includes the capability for diagnosing the parameters of the power electronic switches including drive current, drive voltage and operating temperature and for communicating the status information in a coordinated fashion.

BRIEF DESCRIPTION OF THE DRAWING

The invention, both as to its organization and method of operation, together with further objects and advantages thereof, will best be understood by reference to the specification taken in conjunction with the accompanying drawing in which:

FIGS. 2–8 are diagrammatic representations of signals at various points in the system of FIG. 1;

DETAILED DESCRIPTION

Figure 1:
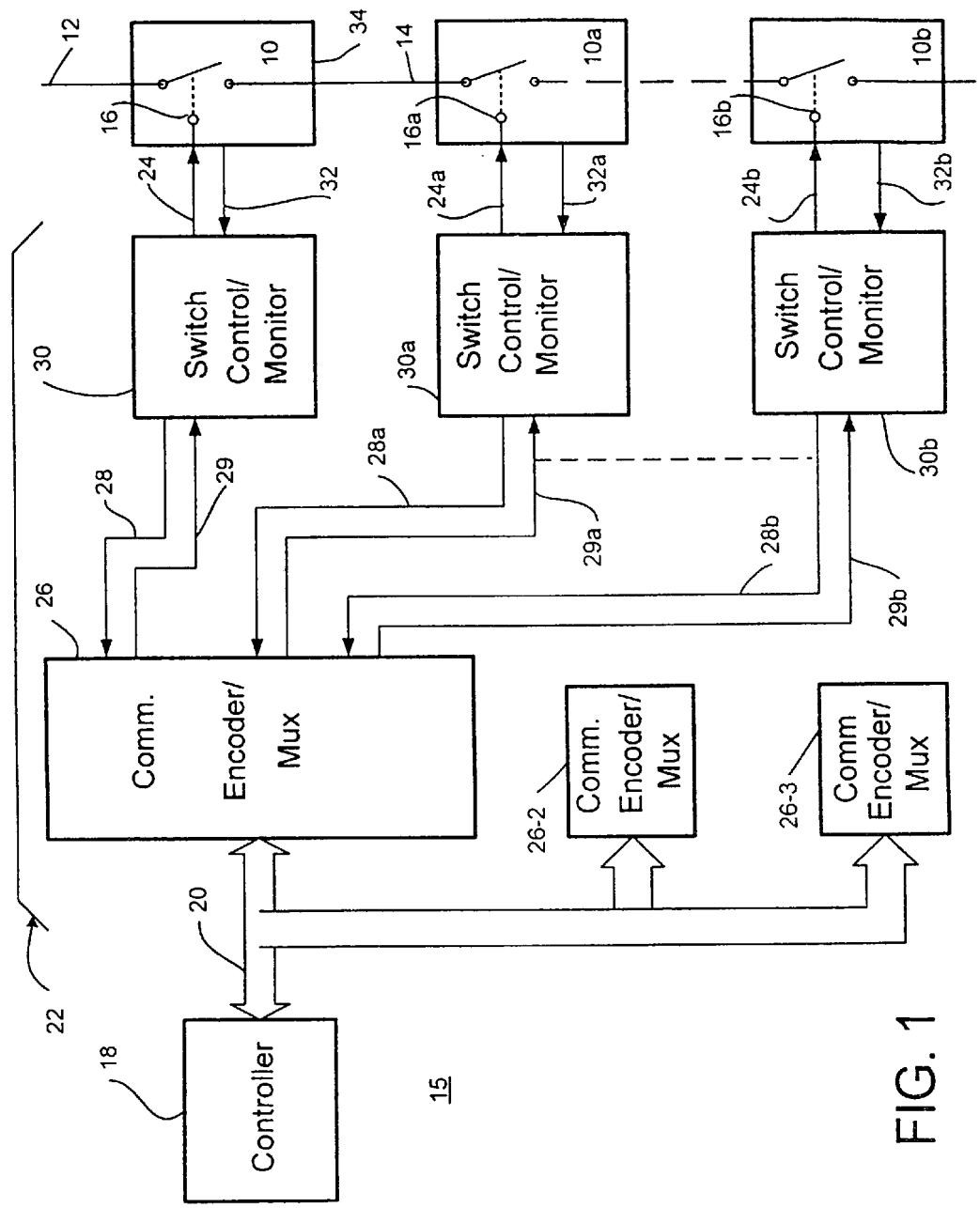
FIG. 1 is a block diagram representation of a power electronic system utilizing the control arrangement of the present invention.

Referring now to FIG. 1, the control arrangement and method of the present invention will be described in connection with an illustrative system 15 that includes a controller 18 that monitors the condition and operating parameters of various components of the system 15 and takes appropriate action to optimize operation thereof, e.g. the operating characteristics of an illustrative electronic switch stage 10 are monitored as will be explained in more detail hereafter. As illustrated, the electronic switch stage 10 includes a main path between lines 12 and 14 that is controlled between on and off states, corresponding to respective conductive and non-conductive states, via a control connection at 16. In a specific illustrative example, the electronic switch stage 10 is a thyristor, IGBT, TRIAC, pair of inverse-parallel connected SCR's, or other actively controlled device.

The system 15 includes an illustrative communications arrangement 22 that cooperates with the controller 18 to provide information to the controller 18 over communications lines at 20, which in specific embodiments is formed by one or more data buses and/or control lines. In the illustrative embodiment, the communications arrangement 22 includes a switch control/monitor stage 30 that is located in the vicinity of the system component to be monitored, e.g. the electronic switch stage 10, and that transmits monitored information to a communications encoder/multiplexer stage 26, "comm. encoder/mux" 26 hereafter, via a communications link 28, e.g. a dielectric medium such as fiber optics in a specific embodiment. As illustrated, where multiple components are monitored by the system 15, multiple switch control/monitor stages 30 are provided along with multiple communication links 28, e.g. 28a, 28b. The comm. encoder/mux stage 26 then functions to multiplex the information on the various communication links 28 and provides the information in a predetermined multiplexed format at 20 to the controller 18.

The control connection 16 of the electronic switch stage 10 is connected to a gate drive signal at 24 provided by the switch control/monitor stage 30. In this illustrative example, the system 15 monitors the gate drive signal at 24 and/or the temperature of the switch stage 10 via data at 32. This arrangement is especially useful where the illustrative electronic switch stage 10 or various other component is located remotely from the controller 18 and/or where the illustrative electronic switch stage 10 is located in a more severe environment that is deleterious for the controller 18, e.g. high-noise, medium voltage, high-temperature etc. In one specific embodiment, the temperature of the switch stage 10 is measured at the location of the switch control/monitor stage 30 with the switch control/monitor stage 30 being in the proximate vicinity of the switch stage 10, e.g. on a common mounting arrangement or heat sink 34 (not shown in detail).

Considering now an illustrative embodiment of the communications arrangement 22 of the system 15 and referring now additionally to FIG. 2, the information on the communication link 28 includes a representation of the gate drive signal 24, such that a pulse signal 40 is sent over the communications link 28 when the electronic switch stage 10 is conducting. The pulse signal 40 is sent on a repetitive basis, e.g. each basic clock cycle or each half-cycle of a fundamental waveform that is present on the line 12 to the electronic switch stage 10. The receipt of this signal 40 by the comm. encoder/mux stage 26 and the transmission of this representation to the controller 18 over lines 20 also indicates that the communications arrangement 22 is operational and that the electronic switch stage 10 is not shorted.

In the illustrative embodiment of FIG. 1, the electronic switch stage 10 is one stage of an overall series-connected electronic switch, e.g. six stages as depicted in FIG. 1 by a second stage 10*a* and a sixth stage 10*b*. Also provided for each stage is one of the switch control/monitor stages 30, e.g. 30, 30*a*, 30*b* which transmits a signal on each of the communication links 28, e.g. 28, 28*a* and 28*b*, to the comm. encoder/mux stage 26. For example, as depicted in FIG. 2, respective signals 42 and 44 are transmitted for the second and sixth electronic switch stages 10*a* and 10*b* which are generated simultaneously and repetitively. The comm. encoder/mux stage 26 then multiplexes the received pulse signals, e.g. 40, 42 and 44, and provides the multiplexed signal at lines 20 to the controller 18. Accordingly, the receipt by the controller 18 of the continuous train of pulses verifies that each switch stage of the stages 10, 10*a*, 10*b* etc., denoted as 10*x* hereafter, is conducting. If the pulses are not continuous, e.g. not present in the predetermined pattern and spacing as shown in FIG. 3, i.e. one or more of the pulses are missing at the periodic rate, then the controller 18 is advised/alerted that something is wrong with either one of the electronic switch stages 10*x* or the communication arrangement 22. If the pulse train of multiplexed signals at 20 is synchronized to the controller 18, the controller 18 can identify which of the stages has a malfunction, e.g. stage 3 in FIG. 3 as indicated by the missing pulse denoted 62.

Considering now an illustrative embodiment where additional information is transmitted over the communications arrangement 22 and referring now additionally to FIG. 4, it is desirable for the controller 18 to ascertain additional information about the various components of the system 15, e.g. the temperature of the electronic switch via the sensed temperature signal 32. To accomplish the communication of additional information, the switch control/monitor stage 30 encodes additional information along with the gate driver signal information, e.g. as shown in FIG. 4 by the addition of a pulse signal 50 that represents temperature of the electronic switch stage 10 along with a representation of the gate driver signal, e.g. pulse signal 52. In a specific arrangement, the width of the pulse 50 is proportional to the sensed temperature at 32. Thus, the pulse signals 50, 52 are sent over the communications link 28 on a periodic basis, e.g. as discussed before, for each basic operational cycle of the system 15. For example, pulse signals 50, 52 correspond to a switch control/monitor stage 30 associated with a first electronic switch stage 10 and pulse signals 54, 56 correspond to the stage 30*a* associated with a second electronic switch stage 10*a*. It should be noted that in FIG. 4, while the pulses are shown sequentially for each stage, the pulses for each of the stages is sent repetitively and simultaneously, the representation in FIG. 4 being the multiplexed sequential arrangement performed by the comm. encoder/mux stage 26 in response to the continuous information received from the various stages on the communication links 28, 28*a*, 28*b* etc.

In a specific embodiment, the comm. encoder/mux stage 26 also incorporates an ambient temperature signal to the controller 18. For example, with additional reference to FIG. 5, after the comm. encoder/mux stage 26 outputs a sequence of pulses corresponding to each of the stages, an ambient temperature signal 60 is encoded or multiplexed into the pulse train in place of the first stage signal or other position. Thus, the controller 18 receives a pulse train of signals representing the gate signal and the temperature of each of the switch stages 10*x* followed by the ambient temperature of the environment of the controller 18 and the comm. encoder/mux stage 26. In this manner, the temperature rise of each switch stage 10 above the ambient temperature is available. Additionally, as shown in FIG. 5, the absence of a pulse signal for any of the stages, e.g. at 63 for stage 3, indicates a malfunction of the communications link or the gate drive signals or the shorted condition of the respective switch stage 10 etc.

In accordance with additional aspects of the present invention, and referring now additionally to FIG. 6, in a preferred embodiment, the gate driver signal pulse 40 is transmitted over the communications link 28, on a normal basis in one specific embodiment, or in another specific embodiment, upon a requested basis as determined by the controller 18. For example, the controller 18 issues a request signal, as illustrated at 64 in FIG. 6, on a communications line 29, e.g. a dielectric medium such as fiber optics in a specific embodiment, to instruct/condition the switch control/monitor stage 30 to initiate the transmission of the combined additional information of the gate signal and the temperature of the switch stage 10. Thus, the stage 30 sends the normal signals as shown in FIG. 2 until a request signal is received whereupon the signals depicted in FIG. 4 are sent, all as depicted in the sequence of FIG. 6.

In accordance with additional aspects of the present invention, the controller 18 over the communication lines at 20 is arranged to issue predetermined ON or OFF signals to control the conductive state of the switch stages 10 to 10*b* over the communications link 29 of the communications arrangement 22. In response to the ON or OFF signals at 20, the switch control/monitor stage 30 sends a gate drive control signal at 24 to turn the switch on or off in accordance with the received signal. For example, signals at 20, either on one line or as a coded representation, are responded to by the comm. encoder/mux stage 26 which issues an ON signal representation over the communications link 29 to the switch control/monitor stage 30. The switch control/monitor stage 30 decodes the ON signal representation on the communications link 29 and outputs a signal at 24 to the switch stage 10. In one embodiment, a momentary ON signal at 20 causes the stage 30 to turn the switch stage 10 on and the switch stage 10 is turned off only upon the issuance of a momentary OFF signal at 20. In another embodiment, the ON signal is continuously output at 29 until the switch control/monitor stage 30 responds with one or more predetermined signals over the communication link 28 to acknowledge that the ON signal has been received and acted upon and/or that the switch stage 10 is conducting, e.g. as shown at 65 or 66 in FIG. 5.

In a specific embodiment, the ON/OFF signals at 20 are encoded over the communications link 29 as a pulse train of a predetermined number of pulses, the ON and OFF signals being a different number of pulses. The comm. encoder/mux stage 26 encodes the pulse train and the switch control/monitor stage 30 counts the pulses of the signal and determines whether or not the received signal is an ON or OFF signal. In one embodiment, the request for diagnostic signal issued by the comm. encoder/mux stage 26 at 29 is a third signal, e.g. a different number of pulses than the ON or OFF signal representations In another embodiment, the request for diagnostic signal to start the transmission of temperature signals over the communication link 28 is the transmission of a predetermined "ON" signal over the link 29. Considering another illustrative embodiment of the present invention and referring now additionally to FIG. 7, the temperature signal alone is communicated via the communications arrangement 22 of FIG. 1, e.g. signal 50 for stage 10, 54 for stage 10a, and the signal 60 for ambient temperature at the stage 26. In another embodiment, a distinct ready signal is utilized by the comm. encoder/mux stage 26 to ready the switch stages 10x for operation in response to an ON command being received from the controller 18 when the switch stages 10x are non-conducting. In such cases, the switch control/monitor stages 30 respond to the detection of the distinct ready signal, e.g. predetermined number of pulses at 29, by sending a signal such as 40 in FIG. 1 or 65 or 66 of FIG. 5 over the communications link 28. When the signals are received by the comm. encoder/mux stage 26, it can be determined that the switch stages 10x are ready for operation and ON signals can be issued over the communication links 29.

The system 15 in a preferred embodiment is applied to a multi-phase electrical power distribution system operating at medium voltages. Accordingly, as shown in FIG. 1, the system 15 includes additional comm. encoder/mux stages 26, e.g. 26-2 and 26-3 for respective second and third phases of an electrical power source. In one embodiment, the stages 26, 26-2 and 26-3 are connected to receive signals from the controller 18 over a common data bus 20 while in other embodiments the signaling paths are independent. In such systems, when the power electronic switch of stages 10, 10a, 10b etc. is non-conducting, it may be desirable to verify its readiness for operation, especially when it may be called upon for rapid, high-speed operation in a high-speed source-transfer application. In one embodiment, and referring now to FIG. 8, when the comm. encoder/mux stage 26 receives a signal at 20 from the controller 18 representing that the switch stages 10x are to be tested, the comm. encoder/mux stage 26 issues ON commands to a first portion of the switch control/monitor stages 30, e.g. N/2 where there are N total switch stages 10x, or (N+1)/2 where N is an odd number, and thereafter issue ON commands to the remaining switch control/monitor stages 30. Accordingly, the information representing operation of the various switch stages 10x is provided to the controller 18 as shown in FIG. 8, first for the first three stages then for the next three stages. This is useful because a non-conducting switch can be tested while the overall switch remains non-conducting. Additionally, in a preferred embodiment, the ambient temperature is also provided, as shown at 60 in FIG. 8. As before, in various embodiments, this can be done with the temperature representations for each stage as shown in FIG. 8 or without the individual temperature representation signals.

Figure 9:
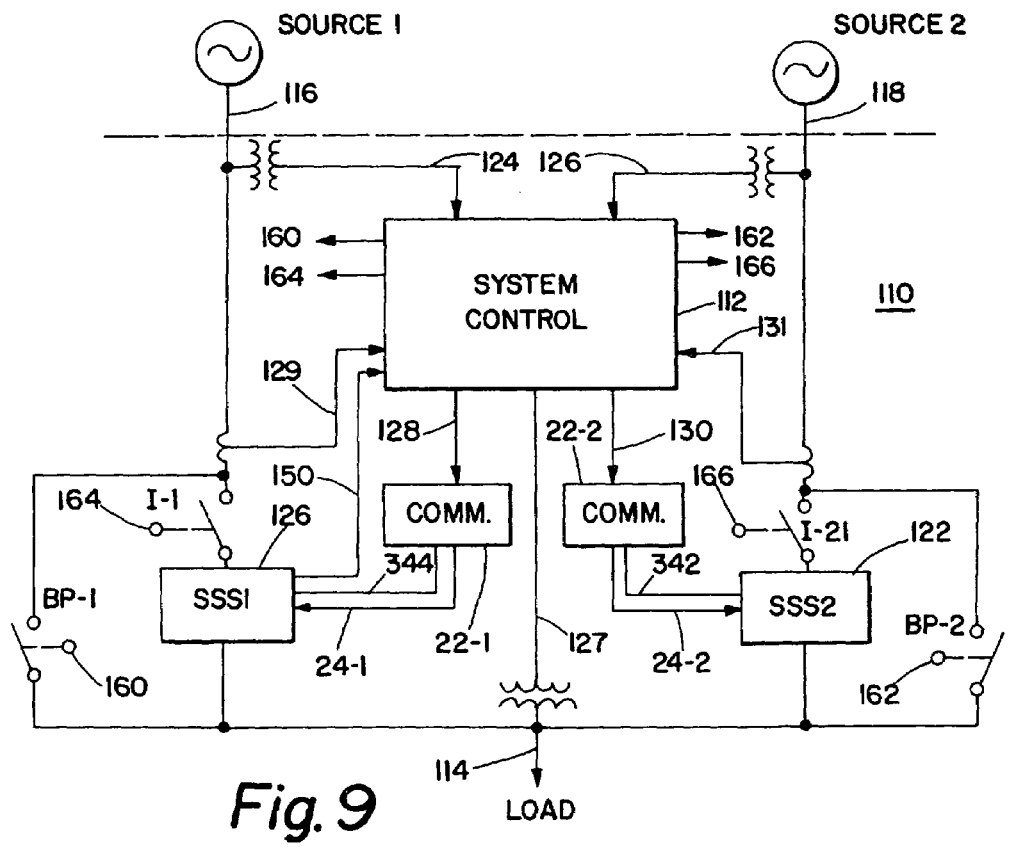
FIG. 9 is a one-line, block diagram representation of a power electronics switching system utilizing the control arrangement of the present invention.

Referring now to FIG. 9, a power electronic switching system functioning as a high-speed source transfer switching system (HSSTSS) 110 is illustrative of a specific system application for which the control arrangement and method of the present invention of FIGS. 1–8 is useful. The HSSTSS 110 supplies a load at 114 with an alternating-current waveform via either a first AC source at 116 or a second AC source at 118. The first and second AC sources 116 and 118 and the load at 114 as provided in an electrical power distribution system are typically multi-phase circuits which are represented in FIG. 9 by a one-line diagram. The HSSTSS 110 includes a first solid-state switch, SSS1, 120 and a second solid-state switch, SSS2, 122, which can also be characterized as electronic switches or power electronic switches. The HSSTSS 110 via a system control 112 controls either SSS1 to supply the load at 114 via the first source 116 or controls SSS2 to supply the load at 114 via the second source 118. In a specific embodiment, the system control 112 includes the controller 18 of FIG. 1. The system control 112 provides appropriate control signals at 128, 130 to control the operation of each respective solid-state switch, SSS1 120 and SSS2 122. In the specific illustrative embodiment, the system of FIG. 9 utilizes the communications arrangement 22 of FIG. 1. Accordingly, the control signals at 128, 130 are utilized by the communications arrangements 22-1 and 22-2 to control the respective solid-state switches SSS1 120 and SSS2 122 over respective gate drive signal arrangements 24-1 and 24-2.

In operation, the system control 112 samples the voltage waveforms of each source 116, 118, e.g. via respective sensing inputs at 124, 126 to detect when transfer between the sources is desirable, e.g. sensing outages and momentary interruptions as well as voltage sags and swells based on the source supplying the load being above or below preset levels. For example, assume that SSS1 120 is turned on by the system control 112 via signals at 128 so as to be conductive and supply the load at 114. If the system control 112 via the sensing input 124 senses that the voltage of the first source at 116 is exhibiting undesirable characteristics, the system control 112 via the control signals at 128, 130 turns off SSS1 and turns on SSS2 so as to transfer the supply of the load at 114 from the first source at 116 to the second source at 118. As used herein, the term "incoming" is used to describe the source and the SSS that will be turned on to supply the load (e.g. the second source at 118 and SSS2 in the illustrative example), and the term "outgoing" is used to describe the source and the SSS that is being turned off (e.g. the first source at 116 and SSS1 in the illustrative example).

Figure 10:
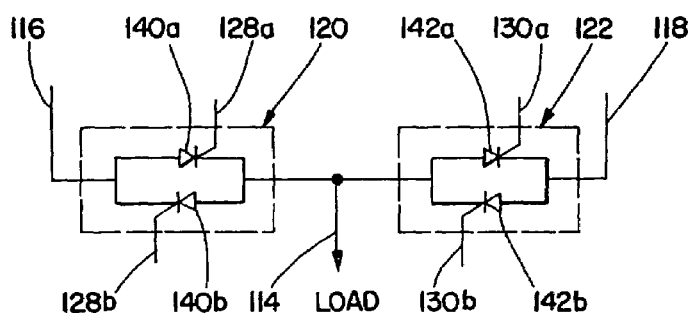
FIG. 10 is a one-line, diagrammatic representation of portions of a solid-state switch of FIG. 9.

Referring now to FIG. 10, each of the solid-state switches SSS1 and SSS2 includes one or more arrays of inverse parallel connected thyristors, e.g. 140a and 140b for SSS1 and 142a and 142b for SSS2. In illustrative implementations, each array of thyristors is rated in the range of 2–12 kv. To provide operation in medium voltage systems, e.g. operating in the range of 2–34.5 kv, one or more of such thyristors SSS1 and SSS2 are connected in series for each phase of the sources, e.g. a plurality of such thyristors being referred to as a stack. Thus, while the term thyristor is used for the solid-state switches SSS1, 140 and SSS2, 142, in specific implementations at medium voltages, this commonly refers to a thyristor stack. For example, in a specific embodiment, each of the solid-state switches SSS1 and SSS2 is implemented by a plurality of the switch stages 10x of FIG. 1.

Considering now operation of the control arrangement and method of the present invention, transfer of the load at 114 from one source to the other, e.g. the first source at 116 to the second source at 118, is generally accomplished by removing the gating signals at 128a, 128b to shut off SSS1 and starting the gating signals at 130a, 130b to turn on SSS2. Thus, the first source at 116 ceases to supply the load at 114 and the second source at 118 begins to supply the load at 114. For desirable transfer control, the controller 112 is provided with additional sensing inputs, e.g. the incoming source-voltage differential is determined by the load voltage at 114 as sensed via a sensing input 127 or by the differential of the source voltages sensed at 124, 126, and the current to SSS1 and SSS2 being sensed via respective current sensing inputs at 129 and 131.

In accordance with additional aspects of the present invention, the system control 112 is provided with features to respond to an overheated condition of the solid state switches SSS1 and SSS2 to transfer the load at 114 to the alternate source. For example, if the temperature sensed via either the communications arrangement 22, or a separate temperature sense line 150 in a specific embodiment, indicates an overheated condition, the system control 112 proceeds with a high-speed transfer. The system control 112 then denotes the alternate source as the preferred source. The now denoted alternate source with the overheated switch is still available on a temporary basis for transfers when the system control 112 detects voltage disturbances on the source currently feeding the load such that transfer is required. In an illustrative embodiment, the overheated condition is defined by any stage of a solid-state switch SSS having a sensed temperature that exceeds the ambient temperature by a predetermined differential. i.e. temperature rise. For example, with reference to FIG. 1, if any electronic switch stage 10 has a sensed temperature at 32 that exceeds the predetermined limits, an overheated condition is determined.

When an overheated condition is detected, if it is not possible to transfer to another viable source, the system 110 includes additional features to initiate and accomplish a backup transfer to bypass and isolate the switches SSS1 and SSS2 of the system 110. Specifically, in an illustrative embodiment, as shown in FIG. 9, to accomplish a bypass/isolation sequence, the system controller 112 controls two bypass switches BP-1 and BP-2 and two isolation switches I-1 and I-2. The switches BP-1, BP-2, I-1 and I-2 are controlled via respective control lines 160, 162, 164 and 166. In accordance with additional features of the present invention, the bypass/isolation sequence is performed to assure optimum load continuity, e.g. as described by the following steps:

Disable high speed transfer control (maintain SSS1, SSS2 states);
Close bypass switch(es) (e.g. BP-1) to match the presently conducting SSS('s), e.g. SSS1;
Confirm that the appropriate bypass switches respond;
Open all isolation switches (e.g. I-1, I-2);
Confirm that the appropriate isolation switches respond;
Remove all gating signals (e.g. at 128, 130) from all SSS's
Enable backup transfer control (e.g. in this case because an SSS is deemed unusable)

In situations where backup transfer control is enabled, e.g. to perform maintenance or service, an overheated SSS, or otherwise unusable SSS (e.g. due to lack of control), the system control 112 is capable of providing source transfer control using the bypass switches BP-1, BP-2, with the isolation switches I-1, I-2 remaining open.

In accordance with additional features of the present invention, when diagnostic information is received by the system controller 112 indicating a potential shorted condition of a switch SSS, e.g. as detected by the loss of the gating signal 40 or 52 for a particular switch stage 10x in FIGS. 1–8, the system controller 112 will identify the switch SSS and the location of the stage within the switch of the potential problem. Appropriate flags, alarms etc. are set and issued. However, the system 110 will continue to operate normally and be fully functional since the switches SSS are designed with devices having suitable predetermined ratings sufficient to be able to function when one of the switch stages 10x is shorted. If diagnostic information is received that identifies a potential shorted condition of a second of the switch stages 10x within the same phase or pole of a switch SSS, the system controller 112 initiates the backup transfer mode as discussed hereinbefore and the high-speed transfer function is disabled. As discussed hereinbefore in connection with diagnostics of the operating parameters of the switches such as SSS1 of the system 110 and the switch stages 10x of FIG. 1, the loss of the signals 40 or 52 indicates that either the switch stage 10x is shorted, the communications arrangement 22 is not functioning or the gate drive signals at 24 are not functioning.

Considering yet further additional features of the present invention, the system controller 112 also monitors the voltage across each switch SSS that is supposed to be in a conducting mode, i.e. the switch SSS that is supplying the load at 114. For example, the system controller 112 monitors the differential voltage between 116 and 114 for switch SSS1. If the differential voltage is greater than a predetermined value, e.g. 1500 v for a 15 kV system, the system controller 112 concludes that the there is a malfunction. This detected condition could be caused by an isolation switch being open (which would not be normal), a blown fuse in the circuit, or the discontinuity of the switch SSS1 (i.e. non-conducting status such as caused by an open circuit or broken connection). If this condition is detected and persists for a predetermined time interval, e.g. 2 milliseconds, the system controller 112 initiates a transfer to the second source 118 by turning on the switch SSS2, and also locks out any transfer back to the switch SSS1. Of course, if for any reason an alternate viable source is not available, the system controller initiates a backup transfer as discussed hereinbefore. In addition or as an alternative to the diagnostic testing of non-conducting switches as discussed hereinbefore, if a switch SSS1 has not been turned on in a predetermined period of time, e.g. one day, the system controller 112 initiates a transfer to interrogate the switch SSS1 to verify proper operation to ensure that a viable alternate source is available if needed.

Figure 11:
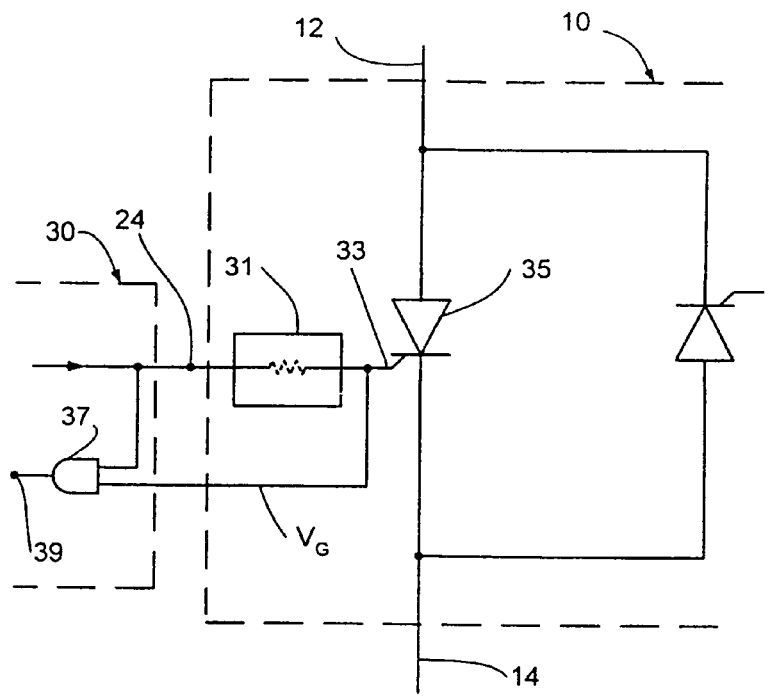
FIG. 11 is a block and schematic diagram of portions of a switch control/monitor stage and a switch stage of FIG. 1.
Figure 12:
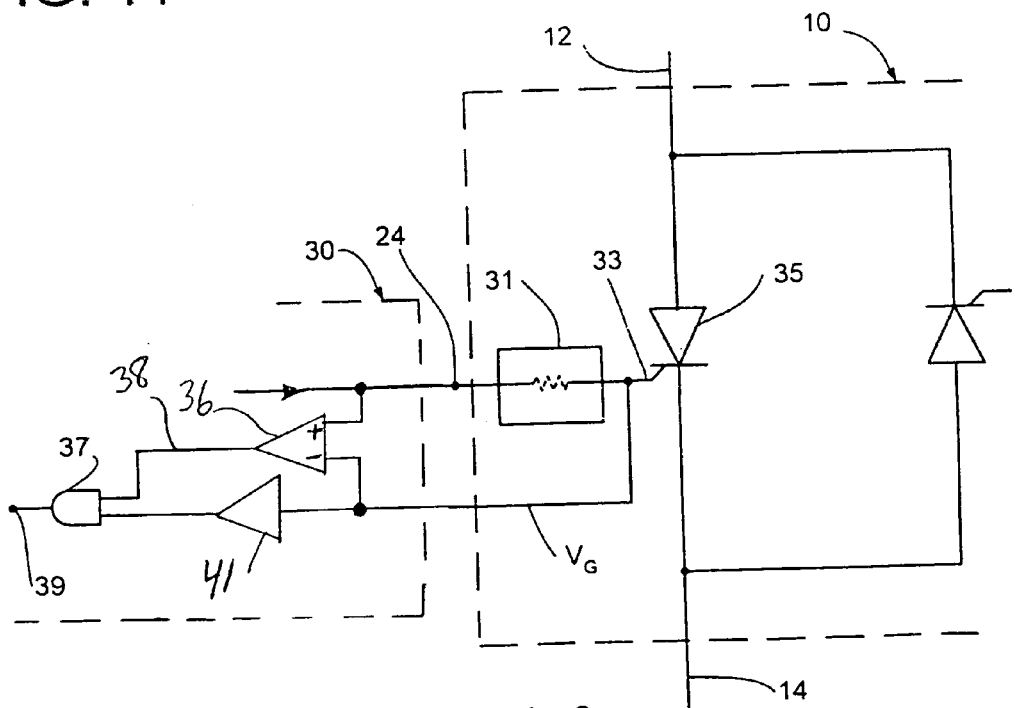
FIG. 12 is a block and schematic diagram of portions of a switch control/monitor stage and a switch stage of FIG. 1 illustrating additional features.

With additional reference now to FIG. 11 and in accordance with other aspects of a specific embodiment of the present invention, a representation of the voltage at the gate 33 of a switch device 35 of the switch stage 10 is also monitored and communicated from the switch control/monitor stage 30 to the comm. encoder/mux stage 26 over the communications link 28. Thus, information representative of the gate voltage at 33 (i.e. $V_G$, the voltage between the gate 33 and the cathode of the switch device 35) provides useful information about the status of the switch stage 10 in addition to the gate drive signal at 24 connected to the gate driver stage 31 that actually provides drive signal to the gate drive circuitry 31 that drives the gate 33 of the switch device 35. For example, the gate drive signal at 24 provides information about the status of the switch control/monitor stage 30 and the gate drive circuitry 31, this gate drive signal 24 corresponding to the drive current into the gate drive circuitry 31 of the switch stage 10 if the gate drive signal 24 is not directly connected to the gate 33 via a resistance or the like (and corresponding to the gate drive current into the gate 33 of the switch device 35 if the gate drive signal 24 is directly connected to the gate 33 via a resistance or the like). In addition, the gate voltage $V_G$ at the gate 33 provides status information about the switch device 35 so as to detect a shorted gate, a miswired switch device, reversed gate leads or shorted wiring or circuitry. The gate voltage $V_G$ at 33 being at least equal to a threshold value (e.g. 0.5 volts) signifies that the switch device 35 is operating properly while a lower voltage indicates a shorted gate or other problem. The representation of the voltage $V_G$ at the gate 33 can be sent in various ways according to various specific embodiment, e.g. in addition to or in lieu of the temperature signal 50. In one specific embodiment, a status signal is sent as the gate drive signal 40 that is the result of the logical AND function of a representation of the gate drive signal at 24 and the voltage $V_G$ at the gate 33 of the switch device 35, e.g. as shown diagrammatically in FIG. 11 by the AND gate 37 providing an output at 39 representative of this combined signal. Thus, this signal at 39 is a high logic level if both the gate drive signal 24 and the voltage $V_G$ at the gate 33 each satisfy the required levels representing appropriate operation. As discussed hereinbefore, the signal representing the voltage $V_G$ can be sent on a normal status basis or as requested by the controller 18. With additional reference to FIG. 12, an arrangement is illustrated that utilizes an actual representation of the gate drive current into the gate 33, e.g. as shown diagrammatically by an operational amplifier stage 36 providing a differencing function between the gate drive signal at 24 and the voltage $V_G$ at the gate 33, the operational amplifier stage 36 providing this gate current representation at an output 38 that is connected to one input of the AND gate 37. Thus, the output 39 of the AND gate 37 in FIG. 12 represents the presence of both gate drive current and gate voltage. A buffer amplifier 41 is shown between the gate voltage signal at 33 and the input of the AND gate 37 for the situation where the AND gate 37 does not accept the unbuffered levels of the signal at 33.

While there have been illustrated and described various embodiments of the present invention, it will be apparent that various changes and modifications will occur to those skilled in the art. Accordingly, it is intended in the appended claims to cover all such changes and modifications that fall within the true spirit and scope of the present invention.

What is claimed is:

1. A method for verifying operation of an electronic power system having an electronic power switch including a control connection input for controlling the conductive state of the electronic power switch and a control facility for providing a drive signal to the control connection input, the method comprising monitoring the voltage at the control connection input, monitoring the current into the control connection input, and providing a determination that the electronic power switch is exhibiting appropriate control connection characteristics when the monitored voltage and current satisfy predetermined levels.

2. The method of claim 1 wherein the electronic power switch includes a plurality of series-connected stages each including a respective control connection input, the method further comprising monitoring the voltage at and current into each of the respective control connection inputs.

3. The method of claim 2 further comprising communicating the monitored voltage and current for each of the plurality of series-connected stages in a predetermined format as a series of signals.

4. The method of claim 3 wherein the method further comprises determining which stage of the electronic power switch is malfunctioning based on the position in the series of signals.

* * * * *